(12) United States Patent
Kindberg et al.

(10) Patent No.: US 8,403,222 B2
(45) Date of Patent: Mar. 26, 2013

(54) METHOD OF ENABLING THE DOWNLOADING OF CONTENT

(75) Inventors: Timothy Paul James Gerard Kindberg, Bristol (GB); Paul John Marsh, Bristol (GB); Kenton O'Hara, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1140 days.

(21) Appl. No.: 12/179,814

(22) Filed: Jul. 25, 2008

(65) Prior Publication Data

US 2009/0069000 A1    Mar. 12, 2009

(30) Foreign Application Priority Data

Jul. 27, 2007  (GB) .................................. 0714662.4

(51) Int. Cl.
*G06K 7/10*    (2006.01)

(52) U.S. Cl. .................. 235/462.45; 235/375; 235/487; 375/220

(58) Field of Classification Search ............. 235/462.45, 235/375, 487; 375/220; 370/352
See application file for complete search history.

(56) References Cited

U.S. PATENT DOCUMENTS

| | | | |
|---|---|---|---|
| 7,216,177 B1 | 5/2007 | Strong et al. | |
| 2002/0069239 A1* | 6/2002 | Katada et al. | 709/202 |
| 2004/0003344 A1* | 1/2004 | Lai et al. | 715/501.1 |
| 2004/0122731 A1* | 6/2004 | Mannik et al. | 705/14 |
| 2004/0173685 A1* | 9/2004 | Imade et al. | 235/487 |
| 2005/0149399 A1* | 7/2005 | Fukunaga et al. | 705/14 |
| 2006/0007921 A1* | 1/2006 | Shimomura | 370/352 |
| 2007/0079383 A1 | 4/2007 | Gopalakrishnan | |
| 2007/0162566 A1 | 7/2007 | Desai et al. | |
| 2010/0245913 A1* | 9/2010 | Suzuki | 358/1.15 |
| 2011/0168773 A1* | 7/2011 | Baltuch | 235/375 |
| 2011/0197269 A1* | 8/2011 | Maselli | 726/6 |
| 2011/0206099 A1* | 8/2011 | Rofougaran et al. | 375/220 |
| 2011/0276558 A1* | 11/2011 | Garg et al. | 707/706 |

FOREIGN PATENT DOCUMENTS

| | | |
|---|---|---|
| GB | 2408614 | 6/2005 |
| JP | 200277994 | 2/2002 |
| JP | 2006243919 | 9/2006 |
| JP | 2006302238 | 11/2006 |
| JP | 200779083 | 3/2007 |
| JP | 2007116646 | 5/2007 |

\* cited by examiner

*Primary Examiner* — Allyson Trail

(57) ABSTRACT

A method of enabling a mobile device to access content relating to a user-selected portion of a web page, the method comprising: receiving a request for the content; generating an information element representative of the requested content, the information element being arranged to enable the mobile device to access the content; and outputting the information element to the mobile device.

17 Claims, 8 Drawing Sheets

METHOD OF ENABLING THE DOWNLOADING OF CONTENT

TECHNICAL FIELD

The present invention relates to a method of enabling the downloading of content.

BACKGROUND TO THE INVENTION

Much information appearing in web pages on computer screens and other displays is valuable for users of mobile devices (such as mobile telephones and PDAs etc.). For example, it would be useful if a train timetable or a map viewed on the screen of a personal computer (PC) could easily be transferred to the user's mobile device.

Conventionally, obtaining Internet/web-based information/content on a mobile device is achieved either by determining the URL of the required information and entering the URL into the mobile device via the device's keypad, which is laborious, can result in re-keying errors and makes for a poor user experience. Alternatively, this can be achieved by saving the content to the computer's memory and subsequently transferring the data to the mobile device using known transferring techniques, such as Bluetooth® or serial cable, which may also be laborious, time consuming and require user input set up for the transfer. Furthermore, the user experience is again poor with this method.

DESCRIPTION OF EMBODIMENTS OF THE INVENTION

According to a first embodiment of the present invention there is provided a method of enabling a mobile device to access content relating to a user-selected portion of a web page, the method comprising: receiving a request for the content; generating an information element representative of the requested content, the information element being arranged to enable the mobile device to access the content; and outputting the information element to the mobile device.

The first embodiment of the present invention provides a method of enabling a mobile device such as a mobile telephone, a pocket PC, PDA or Blackberry® type device, to access content that is displayed or contained within a web page.

In accordance with the embodiment of the present invention, a user may select a portion of a web page and in response to the selection request an information element is generated which is subsequently output/presented to the mobile device. The web page may be displayed on any suitable display device, e.g. a computer screen or alternatively an interactive poster or notice board. The information element is representative of the requested content and is arranged such that, once received by a mobile device, it allows the mobile device to access the content.

In one example, the information element may be the requested content in encoded form. In alternative examples, the information element may relate to an Internet address (URL) at which the content can be accessed.

The information element may be in the form of an optical representation and in this instance the outputting step may conveniently comprise displaying the information element on the display device.

The optical representation may be in the form of a barcode, such as a two-dimensional barcode, a glyph or a dynamic optical encoding of content.

Alternatively, the information element may be in the form of a wireless communication signal such as a radio frequency identity tag sent via a wireless communication channel such as Bluetooth® or WiFi.

As a further alternative, the information element may be in the form of a near field communication signal, e.g. a short range wireless communication signal, and the outputting step may comprise outputting the near field communication signal to a near field communication device.

The information element may also be in the form of an audio transmission signal that could, for example, be received by a microphone on a mobile device.

The user-selected portion of the web page may be associated with its own URL (uniform resource locator). In such an instance, the method may further comprise determining the URL of the selected portion of the web page and the generating step may comprise encoding this URL into the information element.

Conveniently, selectable portions of web pages displayed on the display device are associated with an icon that indicates that there is content accessible to a mobile device. Such icons may be inserted into the mark-up language of the web page by the web page author or conveniently, may be inserted into the displayed web page by an application module on a computer in communication with the display device.

Internet content may be optimised for mobile devices, e.g. via the wireless application protocol (WAP) standard. The presence of such optimised content may be advertised via suitable tags within the selected portion of the web page. Conveniently, the method according to the embodiment of the present invention may comprise determining the presence of such tags and then determining the URL of such optimised content.

Conveniently, a user may be presented via a dialog option box (e.g. a drop down box on a computer terminal) with different options for the form of the information element (e.g. type of optical representation, wireless communication representation etc.).

Where content may be accessed via a conventional internet URL or via a WAP URL then the option box may conveniently present the user with the option of selecting the URL to be accessed by the mobile device.

As an alternative to accessing content via a URL, content may also be encoded directly into the information element and the option box may also provide the user with the option of encoding the content itself into the information element.

Conveniently, the generating step of the method according to an embodiment of the present invention generates the information element in dependence on the option selected by the user from the dialog box.

In the example where the display device is in communication with a computer terminal, the dialog box may conveniently be displayed in response to a "right-click" operation on a mouse or similar input device. Conveniently, selection of an option from the dialog box generates the request for content.

Conveniently, the web page may comprise a plurality of user-selectable portions and the requested content may relate to a user-selectable portion of the plurality of user-selectable portions.

According to a second embodiment of the present invention, there is provided a method of sending content from a computer terminal to a mobile device, the computer terminal having a wireless communication address, the method comprising: receiving a request for content relating to a user-selected portion of a web page; generating an information element comprising a URL of the requested content and the wireless communication address; outputting the information request to the mobile device; receiving a wireless communication message via the wireless communication address from the mobile device, the message comprising a request to download the requested content from the web address; downloading the requested content using the URL in the received message; and forwarding the requested content to the mobile device.

The second embodiment of the present invention provides a method of sending content from a computer terminal to a mobile device. The method comprises receiving, generating and outputting steps corresponding to those of the first embodiment of the present invention. The computer terminal comprises a wireless communications device with an associated device address and the method of the second embodiment also comprises the steps of adding the device address to the information element and receiving a wireless communications message from the mobile device to download the selected content. The computer terminal may then download the requested content for the mobile device and then forward this content onto the mobile device. The forwarding step may use the same wireless communications channel that was used to receive the wireless communications message or an alternative channel.

It is noted that the features described in relation to the first embodiment of the invention may also apply to the second embodiment of the invention.

Another embodiment of the present invention extends to a carrier medium for carrying computer readable code for controlling a processor or computer terminal to carry of the methods of the first or second embodiments of the invention.

Therefore according to the another embodiment of the present invention there is provided a carrier medium for controlling a computer, processor or camera-equipped mobile telecommunications device to enable a mobile device to access content relating to a user-selected portion of a web page, the carrier medium carrying computer readable code comprising: a code segment for receiving a request for the content; a code segment for generating an information element representative of the requested content, the information element being arranged to enable the mobile device to access the content; and a code segment for outputting the information element to the mobile device.

Also according to the another embodiment of the present invention there is provided a carrier medium for controlling a computer, processor or camera-equipped mobile telecommunications device to send content from a computer terminal to a mobile device, the computer terminal having a wireless communication address, the carrier medium carrying computer readable code comprising: a code segment for receiving a request for content relating to a user-selected portion of a web page; a code segment for generating an information element comprising a URL of the requested content and the wireless communication address; a code segment for outputting the information request to the mobile device; receiving a wireless communication message via the wireless communication address from the mobile device, the message comprising a request to download the requested content from the web address; a code segment for downloading the requested content using the URL in the received message; and a code segment for forwarding the requested content to the mobile device.

Another embodiment of the present invention extends to a computer terminal that may perform the methods of the first or second embodiments of the invention and accordingly a third embodiment of the invention provides a computer terminal comprising: a browser application arranged to display a web page having a plurality of user-selectable portions, each user-selectable portion being associated with content; and an application module arranged to: receive a request for content relating to a selected portion of the web page; generate an information element representative of the requested content, the information element arranged to enable a mobile device to access the requested content; and output the information element.

BRIEF DESCRIPTION OF THE DRAWINGS

Preferred, non-limiting embodiments of the present invention will now be described with reference to the accompanying drawings, in which.

DETAILED DESCRIPTION

Figure 1:
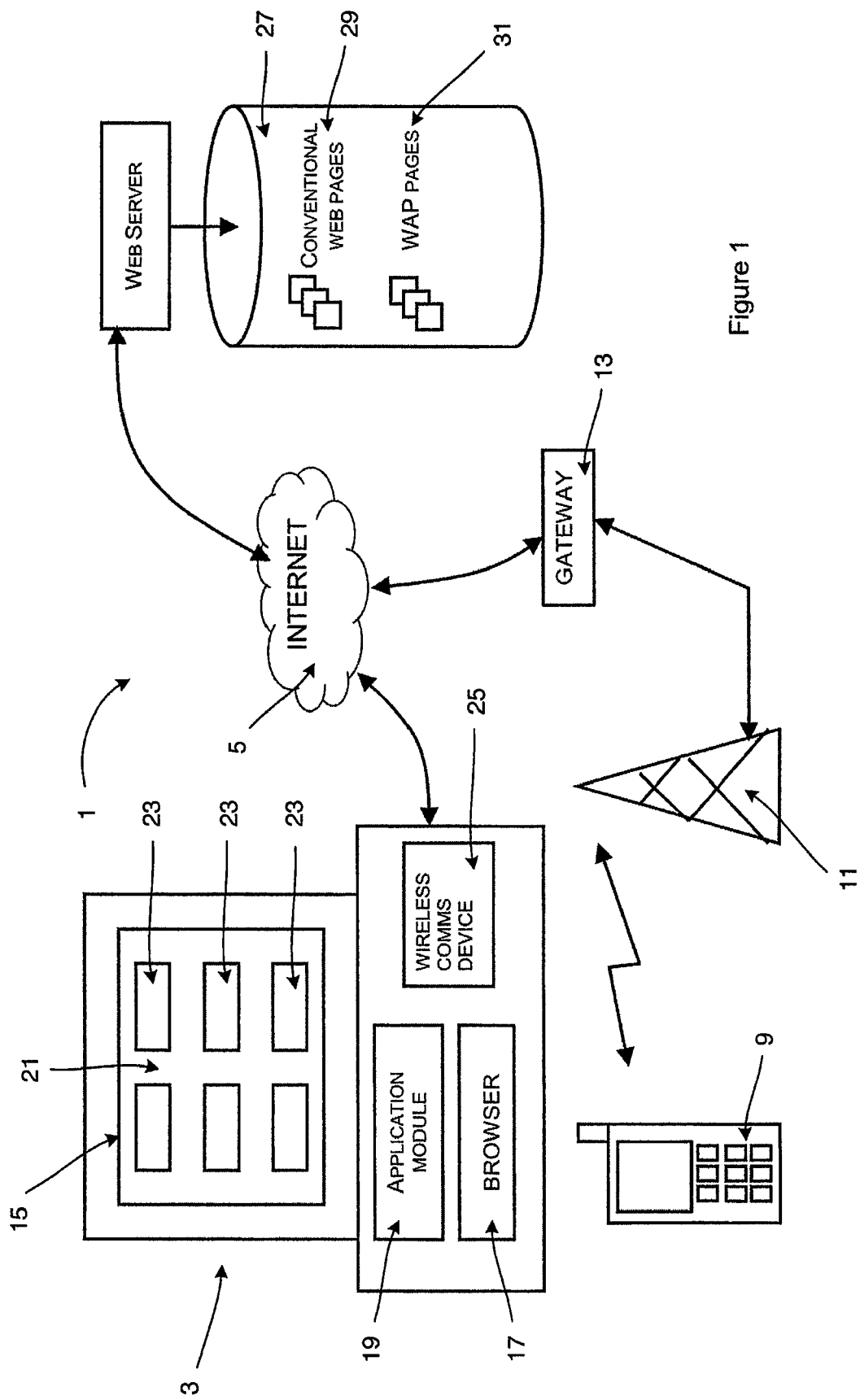
FIG. 1 shows a general representation of a system according to embodiments of the present invention.

Referring to FIG. 1, a general representation of a system 1 according to embodiments of the present invention is depicted. The system 1 comprises a user terminal 3 (also referred to herein as a computer terminal) which is connected to the Internet 5 and also a web server 7 which is connected to the Internet 5. The system further comprises a mobile device 9, such as a mobile telephone, pocket PC, PDA etc., which may connect to the Internet 5 via a mobile communications mast 11 and Internet gateway portal 13.

The computer terminal 3, for example a PC, comprises a display screen 15 and an Internet browser 17. The computer terminal is further provided with an application module 19 in accordance with an embodiment of the present invention. The display screen 15 is depicted showing a web page 21 within which are a plurality of distinct, user selectable portions/regions 23, e.g. the web page may comprise image regions, regions that comprise text and regions that link to further content, such as video or audio content. Each distinct region 23 of the web page is associated with its own Uniform Resource Locator (URL), i.e. each distinct region is associated with a webpage with its own URL address. The user terminal 3 may also comprise a wireless communications device 25 or a near field communications device (such as a radio frequency identification (RFID) transmitter).

The web page 21 displayed on the display screen 15 of the user terminal 3 is provided by the web server 7. The web server is in communication with a database 27 which may store conventional web pages 29 and their associated content (e.g. image content, audio content, video content etc) and which may also store content that has been optimised for display on mobile devices, i.e. "mobile friendly" content. Such mobile friendly content may be in the form of Wireless Application Protocol (WAP) pages 31. The WAP pages may also comprise image content, audio content, video content, text-based content etc.

The mobile device 9 comprises an image capture device (not shown in FIG. 1), e.g. a camera, which may be used to capture images displayed on the display screen 15 of the user terminal 3.

Figure 2:
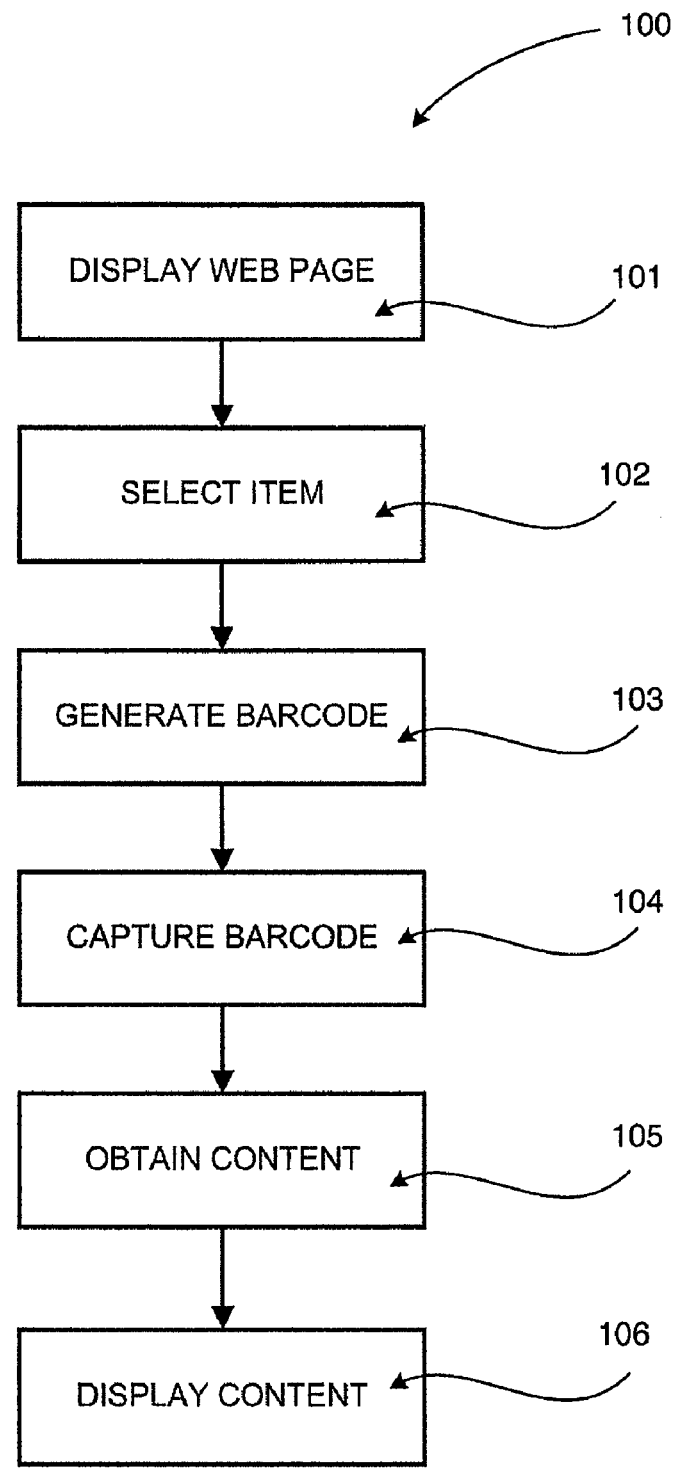
FIG. 2 is a flow chart of a content capture and download process in accordance with an embodiment of the present invention.

FIG. 2 is a flow chart 100 illustrating a method of enabling content corresponding to a selected portion of a web page to be downloaded to a mobile device via the system of FIG. 1 in accordance with embodiments of the present invention.

In Step 101, the user terminal displays a web page on the display screen.

In Step 102, the user selects one of the user-selectable portions of the web page displayed on the screen (i.e. the application module receives a request for content relating to the selected portion of the web page). The selected portion of the web page may be: an image that is displayed as part of the web page; a link to audio or video content; or, text-based content on the web page, e.g. a timetable. Selection of the region may be via a mouse device, a keyboard associated with the user terminal or by any other suitable input device.

In Step 103, the application module generates an information element which is representative of the requested content. One way in which the application module may generate the information element is to encode a URL specific to the selected region. Another way in which the application module may generate the information element to encode the content of the selected region (e.g. a train timetable may be encoded in the barcode). As described in greater detail below, the application module may encode the URL of a conventional webpage (an "internet URL") or it may encode the URL of a mobile-friendly webpage (a "WAP URL"). Once generated, the user terminal causes the information element to be displayed on the display screen or transmitted such that the mobile device may receive it.

The information element enables the mobile device to access the content. For example, the mobile device may receive the information element and decode a URL from the received element. This URL may then be used by the mobile device to access the selected portion of the web page via the Internet. Alternatively, if the information element comprises encoded content then the information element enables the mobile device to directly access the requested content by decoding the received information element.

The information element generated by the application module may comprise a two dimensional barcode, glyph, dynamic optical encoding of data or a message that may be sent via a wireless communications device. The information element may also be generated in the form of an audio transmission signal.

If the information element comprises optical content then this may be displayed on a display device, e,g, the display screen of the computer terminal of FIG. 1, and may be received by the camera on the mobile device. Wireless communication signals may be received by an appropriate wireless communications device on the mobile device, e.g. Bluetooth®, WiFi or a Near Field Communications device. The example described below relates to the display of two-dimensional barcodes that are displayed on the display screen of a computer. It will however be appreciated that any of the above described options for the information element may be used.

In Step 104, the user uses the camera on the mobile device to capture the barcode that was displayed in Step 103.

In Step 105, the mobile device processes the image captured in Step 104 to obtain the content encoded in the barcode. In the example where the barcode encodes a URL, then the mobile device uses this captured address (conventional internet or WAP address) to download content (conventional or "mobile friendly") from the web server. In the example where the barcode encodes the content itself then the mobile device is arranged to decode this content.

In Step 106, the content obtained in Step 105 is displayed.

Figure 3:
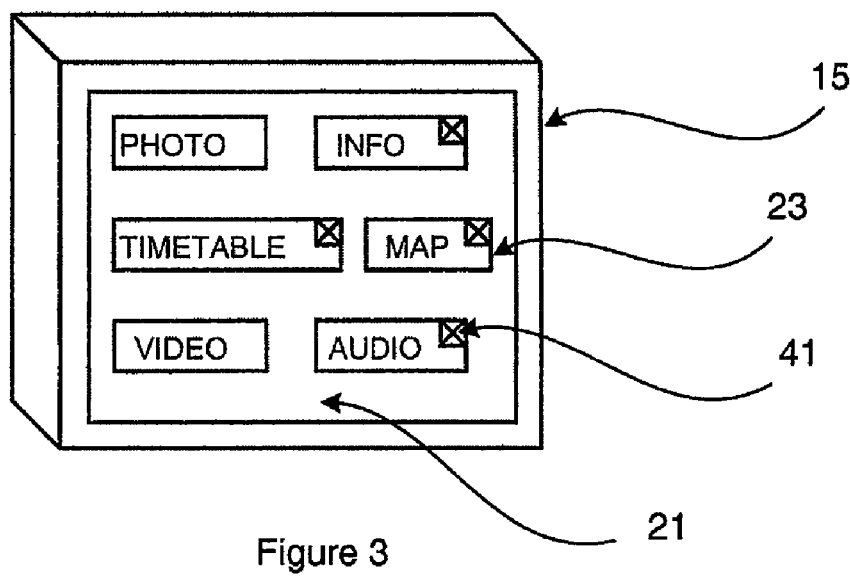
FIG. 3 illustrates a display device according to an embodiment of the present invention.
Figure 4:
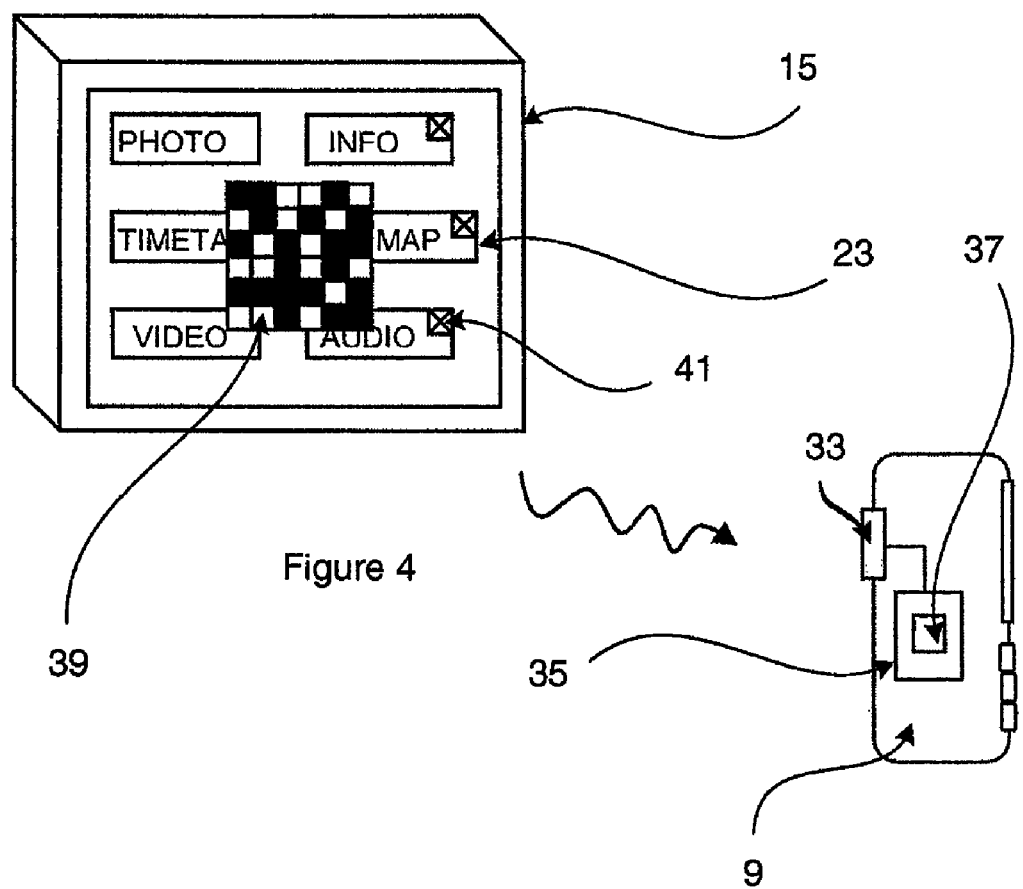
FIG. 4 illustrates the display device of FIG. 3 in which a barcode is displayed to a mobile device.

FIGS. 3 and 4 show web pages 21 on the display screen 15 of the user terminal 3 in accordance with an embodiment of the present invention.

Also depicted in FIG. 4 is a mobile device 9 that comprises a camera 33, and a processing unit 35 comprising a processor 37 that is used to decode barcodes 39 received via the camera 33.

The web page 21 depicted in FIG. 3 comprises different regions 23, each bearing different information, such as a photograph, a timetable, a map and links to video and audio files. It is noted that some of these regions comprise a marker 41, such as an icon, which may be used to signal to a user that there is a region of the web page 21 that may be selected such that a two-dimensional barcode 39 can be generated. The use of an icon 41 to signal the presence of such a region is optional however and a user may determine the presence of such regions by trial and error.

Selection of a region 23 of the web page 21 by a user represents a request for content from the web page. Therefore, once the user selects a region/portion 23 of the web page, the application module generates a barcode 39 which is then displayed on the display screen 15. The barcode may then be captured by a camera-equipped mobile device 9 and the content that it encodes or represents may be obtained by the mobile device.

Selection of a region/portion within the webpage may be achieved by moving a screen cursor onto the region of interest. If the user terminal is operated by means of a mouse device then either "left" or "right" clicking the mouse may select the region. The portion of the web page that is selected may be a hyperlink/URL and in this instance the application module may encode the address of the hyperlink/URL into the barcode.

In the embodiment depicted in FIGS. 3 and 4, selection of a portion 23 of the web page 21 by a user results in a request for content and in the direct generation of a barcode. In a further embodiment however selection of a region may present the user with a range of different options. This further embodiment is shown in FIG. 5.

Right-clicking on regions 23 of a webpage 21 via a mouse device generally presents a number of options 43 to a user. For example, right clicking on an image may present the user with an option to save the URL of the image, with an option to save the image to the user terminal, to copy the image etc.

Figure 5:
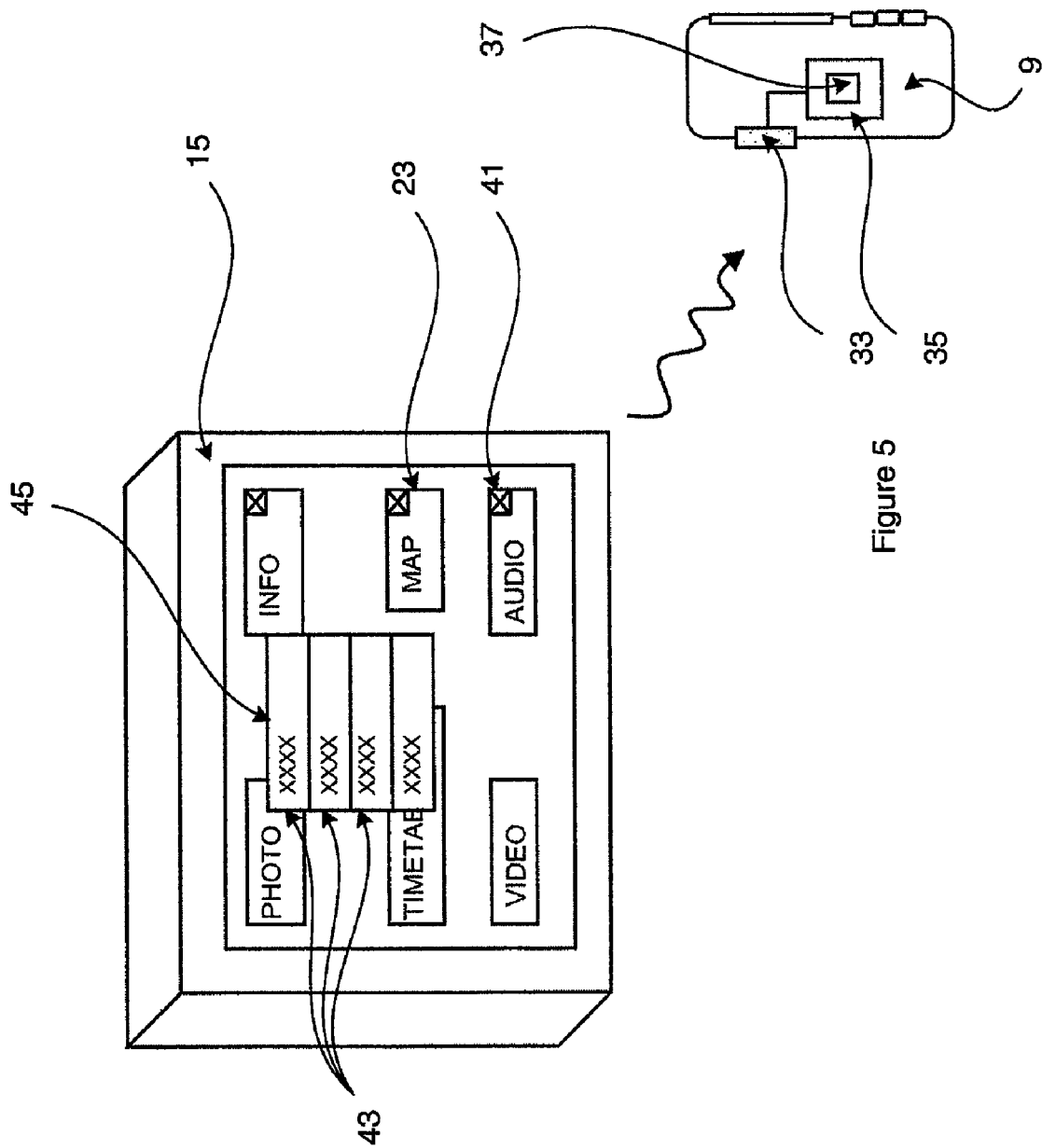
FIG. 5 illustrates a display device according to a further embodiment of the present invention.

In the further embodiment of the invention depicted in FIG. 5, selection of a user-selectable portion 23 of the web page 21 presents the user with a drop down box 45 comprising a number of different options 43, one of which is an option to generate a two dimensional bar code 39 of either the region itself or of a URL associated with that region.

An author of a web page may also create mobile-friendly content in addition to conventional content. For example, a table of text based content in a conventional webpage may display on a display screen of a PC but may display incorrectly on a mobile device (e.g. because the mobile device is unable to handle the formatting used on the conventional webpage). The author may however create equivalent mobile friendly content, e.g. using the WAP format. Therefore, the drop down box 45 may provide an option to create a barcode using the URL of the conventional webpage associated with the selected portion of the webpage and the drop down box may also provide an option to create a barcode using the URL of the mobile-friendly webpage version of the content.

Selection of one of the options 43 in the dialog box 45 generates a request for content to the application module 19. Once the user has selected the appropriate method of barcode generation, the application module 19 generates the appropriate barcode 39 which is displayed on the display screen 15 in the manner depicted in FIG. 4.

Figure 6:
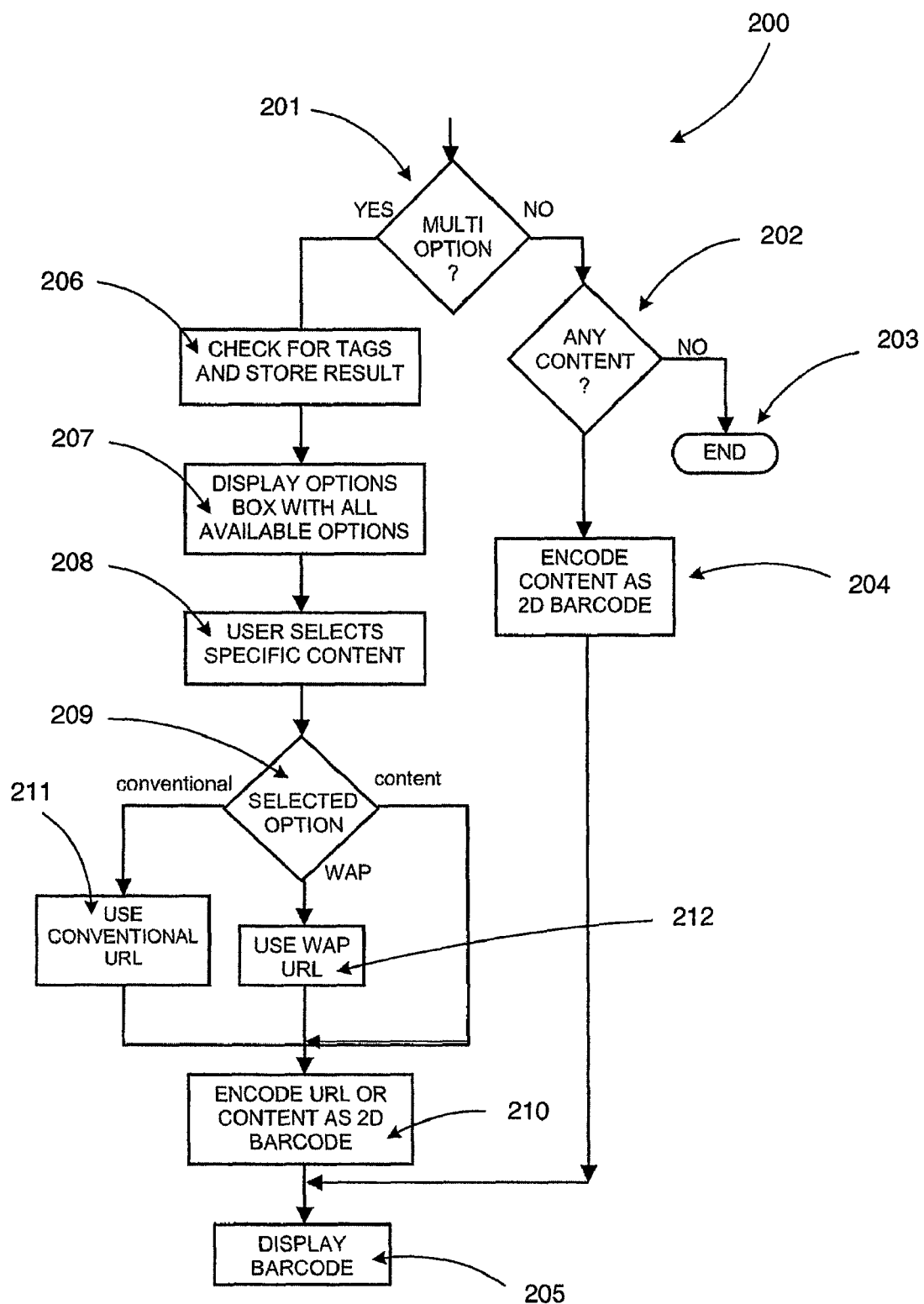
FIG. 6 is a flow chart showing a first part of the process depicted in FIG. 2 in greater detail.

FIG. 6 is a flow chart 200 showing the barcode generation step of FIG. 2 (Step 103) in greater detail. The flow chart of FIG. 6 represents the steps that the application module 19 follows in order to generate and display a barcode 39.

In Step 102 of FIG. 2, the user selected a region 23 of the webpage 21. Step 102 leads into Step 201 of FIG. 6 in which the application module 19 determines if the selected portion of the webpage is associated with multiple user options, e.g. an option to copy, an option to save etc.

If the answer to Step 201 is "no", then the only option the selected portion 23 may be associated with is that of generation of a two dimensional barcode 39, and the application module 19 moves to Step 202 in which it checks to see if there is any content that may be encoded as a barcode 39.

If the answer to Step 202, is "no", then the selected region 23 is not associated with any content that may be encoded as a barcode 39 and the process exits and ends at point 203.

If the answer to Step 202, is "yes", then the selected region 23 may be encoded as a two dimensional barcode 39, and the application module 19 moves to Step 204 in which the content is encoded as a two dimensional barcode.

In Step 205, the content encoded in Step 204 is displayed on the display device 15 of the user terminal 3.

If the answer to Step 201 is "yes", then the application module 19 moves to Step 206, in which it checks for the presence of any HTML tags (or any other suitable tags) that indicate that the web server 7 holds a mobile-friendly version of the webpage currently being displayed. The application module 19 stores the result of this check and then moves to Step 207.

In Step 207 the application module 19 causes a dialog options box 45 to be displayed on screen that lists all the various options 43 to the user. The options box may therefore include one or more of the following options: encode the content of the selected portion of the web page as a two-dimensional barcode; encode the conventional URL of the selected region as a two-dimensional barcode; if available, encode the mobile-friendly URL (e.g. the WAP URL) of the selected region as a two dimensional barcode. (It is noted that some mobile devices are not configured to browse the full, conventional Internet. For such devices it is expected that the user would select the WAP option if presented since this will allow the mobile device to be directed towards a mobile-friendly alternative.)

In Step 208, the user selects one of the options presented in Step 207, as represented by Step 209.

If, at Step 209, the application module 19 determines that the user has decided to directly encode the content of the selected region of the web page as a barcode 39, then the application module 19 goes to Step 210 in which the content contained within the selected region 23 is encoded as a two dimensional barcode 39.

If, at Step 209, the application module 19 determines that the user has decided to encode a link to the conventional webpage 29 corresponding to the selected region, then the application module moves to Step 211 in which it obtains the conventional URL associated with the selected region 23.

Having obtained the conventional URL in Step 211, the application module then moves to Step 210 in which the conventional URL is encoded as a two dimensional barcode 39.

If, at Step 209, the application module 19 determines that the user has decided to encode a link to the mobile-friendly webpage 31 of the selected region 23, then the application module 19 moves to Step 212 in which it obtains the WAP URL associated with the selected region.

Having obtained the WAP URL in Step 212, the application module then moves to Step 210 in which the conventional URL is encoded as a two dimensional barcode.

Once a two dimensional barcode has been encoded in Step 210, the application module 19 causes the barcode 39 to be displayed in Step 205. In other words the encoded address relating to the selected portion of the web page is displayed on the display device (e.g. the screen 15 of the user terminal 3).

Figure 7:
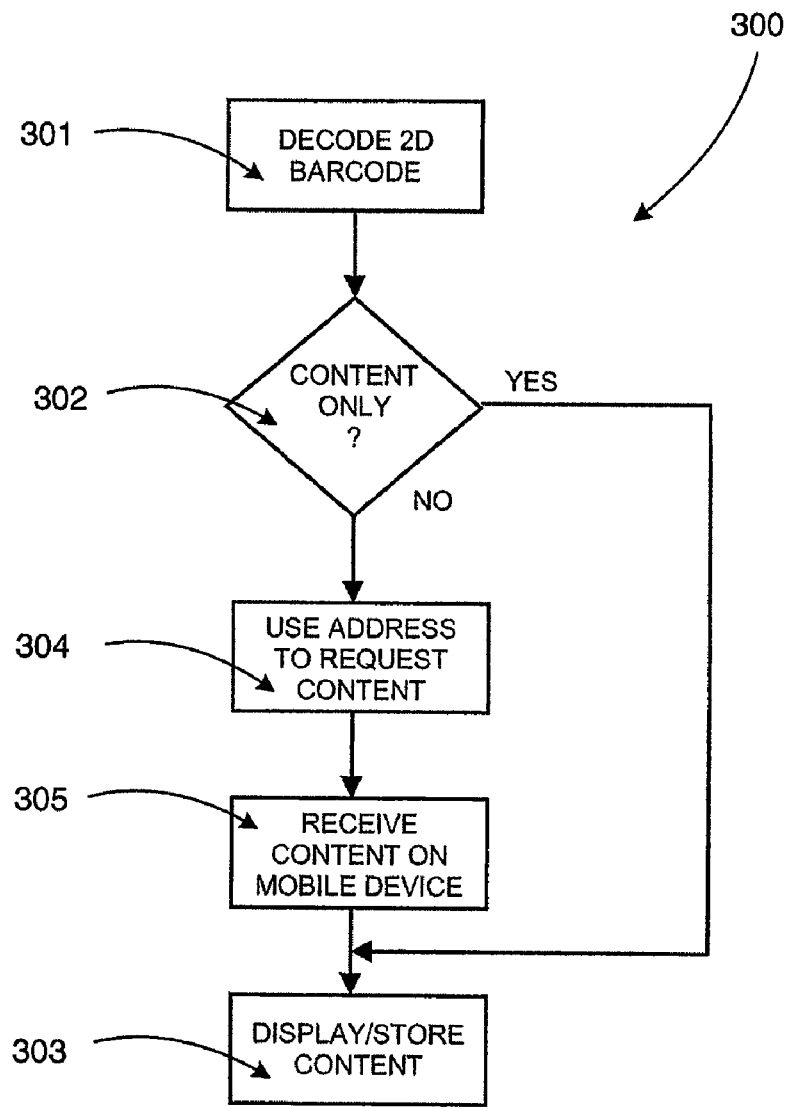
FIG. 7 is a flow chart showing a second part of the process depicted in FIG. 2 in greater detail.

FIG. 7 is a flow chart 300 of a decoding process in accordance with an embodiment of the present invention.

Prior to Step 301, the mobile device will have received the two dimensional barcode 39 that has been displayed by the display screen 15 by capturing an image of the barcode 39 using the camera 33 on the mobile device 9. The mobile device will therefore have received either an encoded address or encoded content which relates to the user-selected portion 23 of the web page 21.

At Step 301, the mobile device 9 (via the processor 37) decodes the two dimensional barcode 39.

At Step 302, the processor 37 assesses whether the decoded barcode relates to content only or whether the decoded barcode is a web page address/URL.

If the processor determines that the barcode comprises content only then it moves to Step 303 and displays the content on the mobile device.

If the processor determines that the barcode comprises the address of a web page 21 then in Step 304 it uses the decoded/received address to request content from the web page in question.

In Step 305 the mobile device 9 receives the content. Any suitable transmission channel may be used to receive the content, e.g. connection via the mobile device's communication network (11, 13) or via a WiFi network 25.

Once the content has been received in Step 305, the mobile device moves to Step 303 and displays/stores the content.

Figure 8:
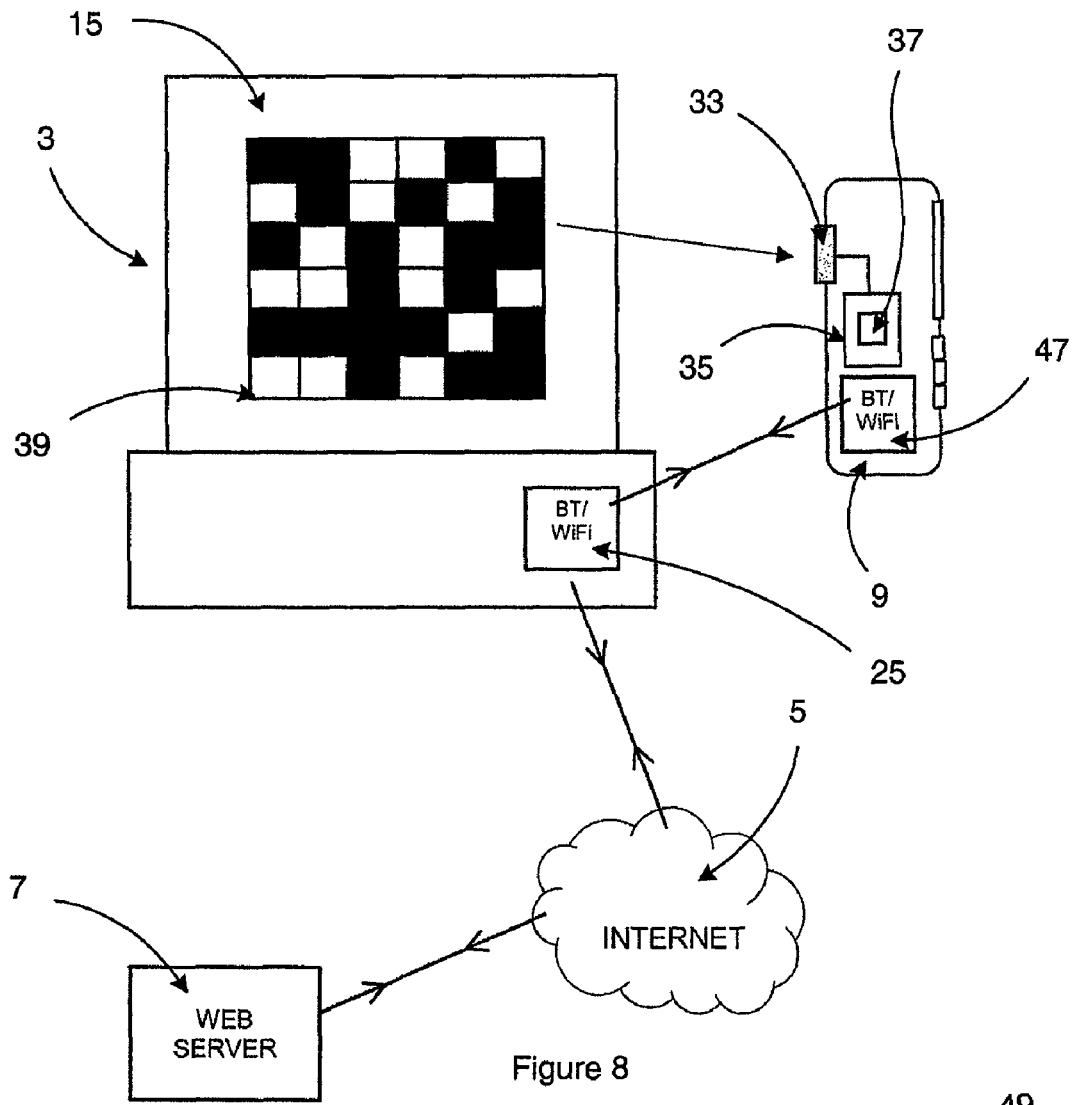
FIG. 8 illustrates a display device according to a yet further embodiment of the present invention.

FIG. 8 is a general schematic representation of a further embodiment of the invention in which the user terminal 3 is used to download the content from the Internet 5 instead of the mobile device 9.

FIG. 8 shows a computer terminal 3 with a screen 15 that is displaying a two dimensional barcode 39 as described above in relation to FIG. 4. The user terminal 3 of FIG. 8 additionally comprises a wireless communications capability, e.g. a WiFi device, a Wireless local area network (wireless LAN) device, a Bluetooth transceiver or an infrared port, generally referenced as feature 25. The mobile device 9 shown in FIG. 8 also comprises a wireless communications device 47.

In the present embodiment, the barcode 39 displayed on the display screen 15 of the user terminal 3 encodes content or the URL address of content (as described above in relation to FIG. 6 for example) but also, additionally, encodes the address of the user terminal's wireless communications device, e.g. the Bluetooth address of the user terminal or the WiFi address of the user terminal is encoded in the barcode.

Figure 9:
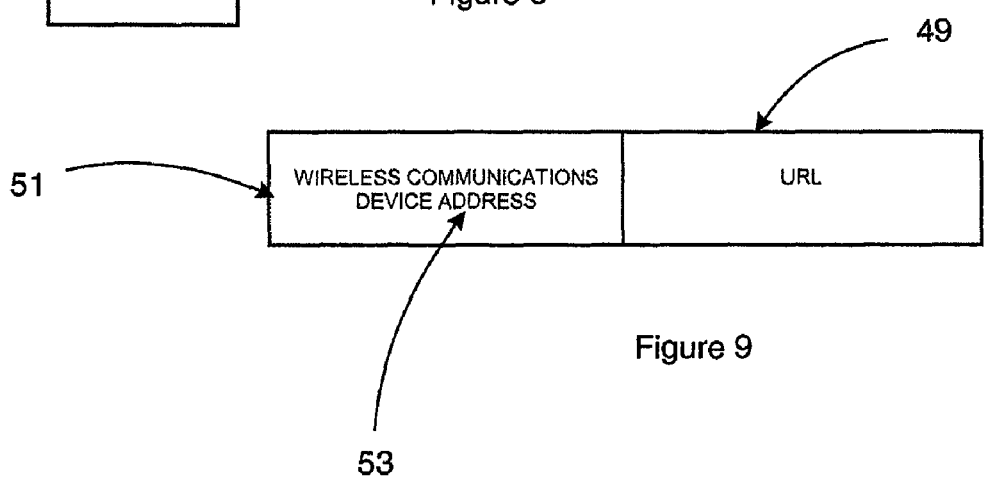
FIG. 9 is a schematic representation of the information that may be encoded in the barcode of the yet further embodiment of the present invention.

FIG. 9 is a schematic representation of the information that is encoded in the barcode 39 and it can be seen that it comprises a URL portion 49 that contains the URL address (conventional or WAP) of the content and it also comprises an address portion 51 that contains the address details 53 of the user terminal's wireless communications device 25.

Returning to FIG. 8 it can be seen that the user terminal 3 may communicate with a web server 7 via an Internet connection 5. This Internet connection may be via the above described wireless communications device 25 or may be via an alternative route, e.g. wired Internet connection.

In the present embodiment, the mobile device 9 may receive the barcode 39 as described in relation to FIGS. 2 and 7. However, rather than the mobile device accessing the web page (29, 31) itself it may send a message to the user terminal 3 using the wireless communications connection address 53 that was decoded from the barcode 39 and request that the user terminal 3 downloads the content for the mobile device 9.

The user terminal may therefore act as a "proxy" for the mobile device.

Figure 10:
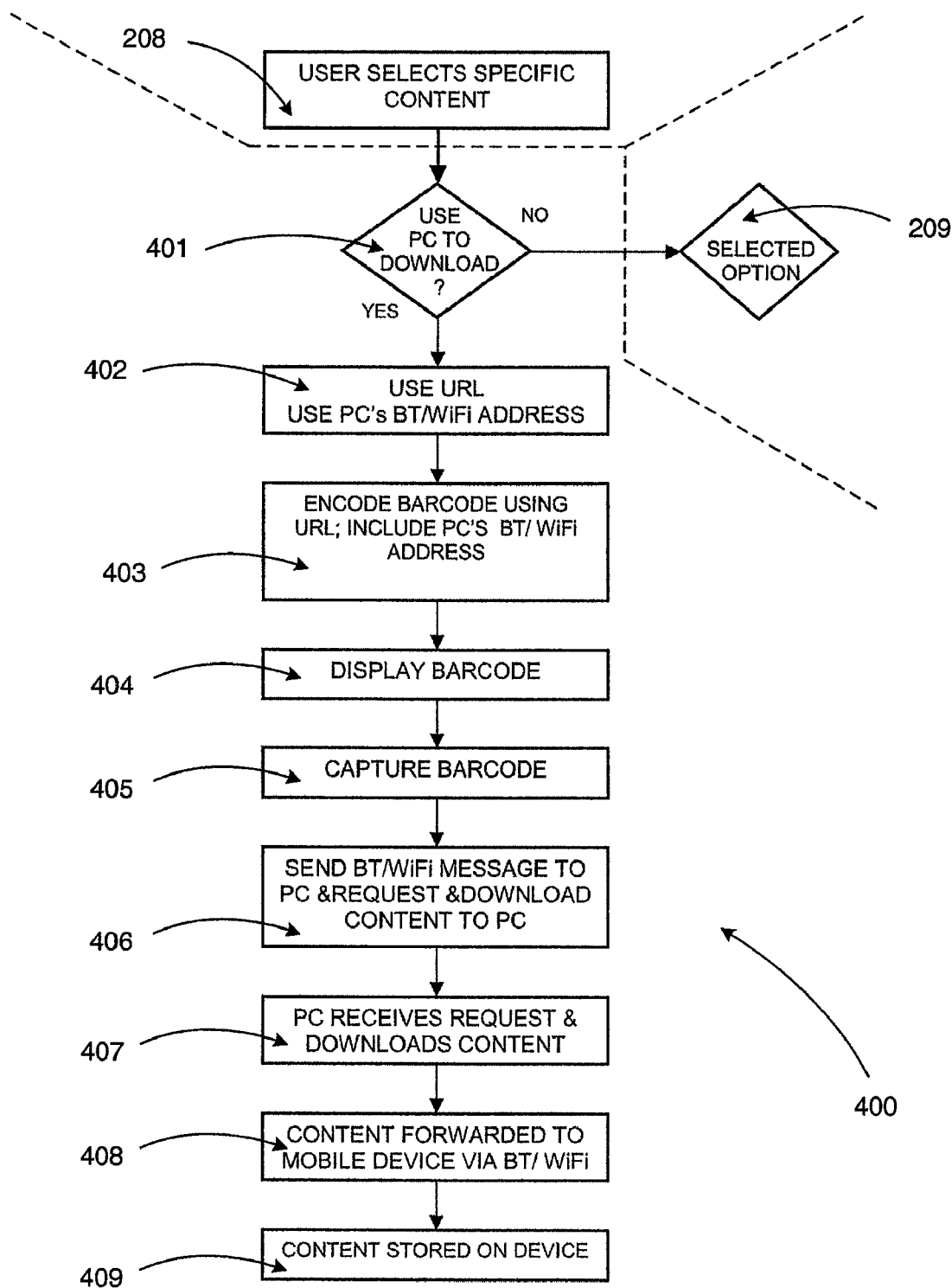
FIG. 10 is a flow chart content capture and download process in accordance with the yet further embodiment of the present invention.

FIG. 10 is a flow chart 400 of the content download process in accordance with the embodiment of the invention described in relation to FIGS. 8 and 9.

At Step 207 in FIG. 6 the application module 19 caused a dialog options box 45 to be displayed on screen that listed all the various options 43 to the user. As described in FIG. 6 the user was able to choose in Step 208 between three different options: encode content into barcode; encode conventional URL into barcode; encode WAP URL into barcode.

In the embodiment of FIGS. 8 to 10, the user is presented with a further option—the option to download content via the user terminal.

At Step 401 therefore the application module checks whether the user terminal is to be used to download the content. If the user has selected "no" at this stage then the process moves to Step 209 and follows the flow chart as described in FIG. 6.

If, however, the user selects "yes" then the application module moves to Step 402 in which it selects the content's conventional/WAP URL address to use when encoding the barcode 39 and also the address 53 of the user terminal's wireless communication's Internet device 25 (E.g. the user terminal's Bluetooth or WiFi address).

In Step 403, the two dimensional barcode is encoded using the conventional WAP/URL and also the user terminal's wireless communications connection address.

In Step 404 the barcode is displayed on the user terminal's display screen.

In Step 405, the camera on the mobile device is used to capture the two dimensional barcode.

In Step 406 the mobile device sends the user terminal a message via the advertised wireless communications channel using the wireless address that was encoded in the barcode. The message sent by the mobile device requests that the user terminal downloads the content from the conventional/WAP URL (as appropriate) and requests that the content be downloaded to the user terminal.

In Step 407, the user terminal receives the message and request from the mobile device and downloads the requested content using the conventional URL address provided in the message.

In Step 408 the content is forwarded from the user terminal to the mobile device using the wireless connection used to relay the message in Step 406.

In Step 409 the mobile device stores the content.

In the embodiment of FIGS. 8 to 10, the two-dimensional barcode 39 may be constructed by the web browser 17 without requiring any mark-up language specific to the creation of the barcode, and therefore independently of any such instruction in the content. This contrasts with the arrangement described in the Applicant's co-pending application filed under the reference 200601374-1 in which the barcode is constructed in accordance with instructions encoded within the mark-up language of the web-based application.

Certain embodiments of the present invention provide a convenient way for people to take information away with them, after looking up the information on a separate display. It removes the need to print out the information, or to move it electronically to the mobile device in one of the current ways which involves effort on the part of the user and which is error-prone. Moreover, in many cases such as the retrieval of relatively small images, or for entire pages for which a variant adapted for the mobile device exists, the content provided does not need to modify existing content in any way.

Although the various features of the present invention have been described above with reference to preferred embodiments, it will be apparent that numerous alternative embodiments are possible within the scope of the present invention.

For example, instead of using a computer terminal (personal computer), it would be possible to use any suitable display device, e.g. an electronic information board in a museum, in which a desired portion of the information displayed can be selected by a user so as to generate a graphic representation of a URL or the address within a local wireless network of the information board, or alternatively an electronic poster/advertisement. The graphic representation can then be captured by the user's mobile device, as with the embodiments described above.

The above described embodiments describe the use of a two dimensional barcode to encode content and URL/addresses. However, it is to be appreciated that any optical representation, such as a glyph or dynamic optical encoding of data, may be used to encode content and URL/addresses. The mobile device may then be arranged to capture and decode the particular optical representation used by the display device.

In a further embodiment content and URLs/addresses may be encoded using a suitable wireless communications device (e.g. Bluetooth® or WiFi) or a Near Field Communications device, such as a radio frequency identification tag. The mobile device may therefore be configured to receive the encoded data via this alternative communications channel as well as or instead of the above described optical embodiments. Where a near field communications channel is used the mobile device may comprise a suitable reader device for receiving the near field communication.

The invention claimed is:

1. A method of sending content from a computer terminal to a mobile device, the computer terminal having a wireless communication address, the method, executed on the computer terminal, comprising:
   receiving a request for content relating to a user-selected portion of a web page;
   generating an information element based upon the requested content and the wireless communication address of the computer terminal, wherein the information element is in the form of optical content;
   outputting the information element to the mobile device, wherein outputting the information element comprises displaying the optical content on a display device;
   receiving a wireless communication message from the mobile device, the message comprising a request to download the requested content from a web address associated with the requested content;

downloading the requested content from the web address; and forwarding the requested content to the mobile device.

2. A method as claimed in claim 1, wherein the optical content comprises a two-dimensional barcode.

3. A method as claimed in claim 1, further comprising determining a URL of the user-selected portion of the web page and wherein the generating step comprises encoding the URL into the information element.

4. A method as claimed in claim 1, wherein selectable portions of the web page are associated with an icon indicating content accessible to mobile devices.

5. A method as claimed in claim 1, further comprising determining the presence of tags within the user-selected portion of the web page that indicate the availability of content optimized for mobile devices.

6. A method as claimed in claim 5, further comprising determining a URL for the optimized content.

7. A method as claimed in claim 1, further comprising displaying a dialog option box on a display device, the dialog option box providing a user with different options for the form of the information element.

8. A method as claimed in claim 7, wherein requested content may be accessed from an internet URL or a WAP URL and the dialog option box presents the user with the option of selecting the URL from which the requested content is forwarded to the mobile device.

9. A method as claimed in claim 8, wherein requested content is directly encoded into the information element and the dialog option box additionally presents the user with the option of encoding the requested content into the information element.

10. A method as claimed in claim 8, wherein generating an information element comprises generating the information element based on the URL selected from the dialog option box.

11. A method as claimed in claim 7, wherein the display device is in communication with the computer terminal and the dialog box is displayed in response to a right click operation on a mouse-type device in communication with the computer terminal.

12. A method as claimed in claim 11, wherein selection of an option from the dialog box generates a request for content.

13. A method as claimed in claim 1, wherein generating an information element comprises encoding the content relating to the selected portion into the information element.

14. A method as claimed in claim 1, wherein the web page comprises a plurality of user-selectable portions and the requested content relates to a user-selectable portion of the plurality of user-selectable portions.

15. A method as claimed in claim 1, wherein the computer terminal comprises a wireless communications device that comprises one of a Bluetooth transceiver, a WiFi transceiver; and the requested content is additionally forwarded to the mobile device by one of: a Bluetooth message and a WiFi transmission.

16. A computer terminal comprising:
a browser application to display a web page having a plurality of user-selectable portions, each user-selectable portion being associated with content; and
an application module to:
receive a request for content relating to a selected portion of the web page;
generate an information element representative of the requested content and a wireless communication address of the computer terminal, wherein the information element is in optical form;
output the information element on a display device to a mobile device;
receive a wireless communication message from the mobile device, the message comprising a request to download the requested content from a web address associated with the requested content; and
download the requested content from the web address.

17. A method of receiving content on a mobile device, the method, executed on the mobile device, comprising:
receiving from a computer terminal having a wireless communication address, an information element in optical form, the information element including a URL based upon requested content and the wireless communication address of the computer terminal;
outputting a wireless communication message to the computer terminal, the message comprising a request to download the requested content from a web address associated with the requested content; and
receiving the requested content from the computer terminal.

* * * * *